(12) United States Patent
Baier et al.

(10) Patent No.: US 7,512,906 B1
(45) Date of Patent: Mar. 31, 2009

(54) SYSTEM AND METHODOLOGY PROVIDING ADAPTIVE INTERFACE IN AN INDUSTRIAL CONTROLLER ENVIRONMENT

(75) Inventors: John Joseph Baier, Mentor, OH (US); Douglas R. Wylie, Eastlake, OH (US); David A. Vasko, Macedonia, OH (US); David Michael Callaghan, Concord, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 604 days.

(21) Appl. No.: 10/161,848

(22) Filed: Jun. 4, 2002

(51) Int. Cl.
G06F 3/00 (2006.01)
G06F 3/14 (2006.01)
G06F 15/16 (2006.01)
G06F 17/30 (2006.01)

(52) U.S. Cl. .............. 715/866; 715/765; 715/771; 715/747; 715/744; 709/203; 700/83

(58) Field of Classification Search .............. 715/866, 715/765, 744, 747, 762, 771; 345/156, 7, 345/8; 700/83, 96; 719/328, 332, 319; 709/201, 709/203
See application file for complete search history.

(56) References Cited

U.S. PATENT DOCUMENTS

| | | | |
|---|---|---|---|
| 5,122,948 A | 6/1992 | Zapolin | 364/131 |
| 5,611,059 A * | 3/1997 | Benton et al. | 700/83 X |
| 5,682,460 A * | 10/1997 | Hyziak et al. | 709/217 |
| 5,710,885 A | 1/1998 | Bondi | 395/200.54 |
| 5,844,794 A | 12/1998 | Keeley | 364/138 |
| 5,845,149 A | 12/1998 | Husted et al. | 395/829 |
| 5,978,568 A | 11/1999 | Abraham et al. | 395/200.54 |
| 6,199,068 B1 * | 3/2001 | Carpenter | 707/100 |
| 6,279,113 B1 | 8/2001 | Vaidya | 713/201 |
| 6,324,607 B1 | 11/2001 | Korowitz et al. | 710/102 |
| 6,381,502 B1 * | 4/2002 | Rudder et al. | 700/83 X |
| 6,400,996 B1 | 6/2002 | Hoffberg et al. | 700/83 |
| 6,412,032 B1 | 6/2002 | Neet et al. | 710/52 |
| 6,457,024 B1 * | 9/2002 | Felsentein et al. | 345/8 |

(Continued)

FOREIGN PATENT DOCUMENTS

EP 03 02 6339 3/2004

(Continued)

OTHER PUBLICATIONS

Compuquest, Inc., SPM-IM-Instant Messaging Client for SpreadMsg Wireless Messaging Software, http://www.compuquestinc.com/spmim.html.

(Continued)

*Primary Examiner*—X. L Bautista
(74) *Attorney, Agent, or Firm*—Amin Turocy & Calvin, LLP; R. Scott Speroff

(57) ABSTRACT

The present invention relates to a system and methodology providing adaptive user interface capabilities in an industrial control environment. A user interface is provided that can operate across various software and/or hardware platforms. The platforms can be adapted with smart devices and/or wearable devices to facilitate access to a control system and can be adapted as a remote web service and/or adapted to interact with the service. The user interface can be tuned or adjusted in accordance with device capabilities operating the interface and can be adjusted or modified according to various operator or administrative preferences.

19 Claims, 10 Drawing Sheets

U.S. PATENT DOCUMENTS

| | | | | |
|---|---|---|---|---|
| 6,463,338 | B1 | 10/2002 | Neet | 700/17 |
| 6,535,926 | B1 | 3/2003 | Esker | 709/248 |
| 6,624,388 | B1 | 9/2003 | Blankenship et al. | 219/130.5 |
| 6,640,145 | B2 | 10/2003 | Hoffberg et al. | 700/83 |
| 6,651,062 | B2 | 11/2003 | Ghannam et al. | 707/10 |
| 6,675,226 | B1 | 1/2004 | Nair et al. | 709/250 |
| 6,691,159 | B1 | 2/2004 | Grewal et al. | 709/219 |
| 6,708,074 | B1 * | 3/2004 | Chi et al. | 700/96 X |
| 6,714,974 | B1 | 3/2004 | Machida | 709/223 |
| 6,728,262 | B1 | 4/2004 | Woram | 370/466 |
| 6,732,165 | B1 | 5/2004 | Jennings, III | 709/220 |
| 6,732,191 | B1 | 5/2004 | Baker et al. | 710/1 |
| 6,819,960 | B1 * | 11/2004 | McKelvey et al. | 700/83 X |
| 6,891,850 | B1 | 5/2005 | Vandesteeg et al. | 370/466 |
| 6,895,532 | B2 | 5/2005 | Raynham | 714/46 |
| 6,904,600 | B1 | 6/2005 | James et al. | 719/328 |
| 6,907,302 | B2 * | 6/2005 | Karbassi | 709/203 X |
| 6,965,802 | B2 | 11/2005 | Sexton | 700/83 |
| 6,970,913 | B1 | 11/2005 | Albert et al. | 709/217 |
| 6,982,953 | B1 | 1/2006 | Swales | 320/218 |
| 7,032,045 | B2 | 4/2006 | Kostadinov | 710/105 |
| 7,103,428 | B2 * | 9/2006 | Varone et al. | 700/83 |
| 7,133,900 | B1 | 11/2006 | Szeto | 709/206 |
| 7,277,865 | B1 * | 10/2007 | Silverstone et al. | 705/26 |
| 7,289,994 | B2 | 10/2007 | Nixon et al. | |
| 7,310,344 | B1 | 12/2007 | Sue | |
| 2002/0004798 | A1 * | 1/2002 | Babula et al. | 707/104.1 |
| 2002/0046239 | A1 | 4/2002 | Hardy et al. | 709/203 |
| 2002/0049833 | A1 * | 4/2002 | Kikinis | 709/219 |
| 2002/0065898 | A1 | 5/2002 | Leontiev et al. | 709/208 |
| 2002/0068983 | A1 | 6/2002 | Sexton | 700/2 |
| 2002/0073236 | A1 | 6/2002 | Helgeson et al. | 709/246 |
| 2002/0107904 | A1 | 8/2002 | Talluri et al. | 709/202 |
| 2002/0156872 | A1 | 10/2002 | Brown | 709/219 |
| 2002/0156926 | A1 | 10/2002 | Batke et al. | 709/250 |
| 2002/0161745 | A1 | 10/2002 | Call | 707/1 |
| 2003/0009253 | A1 * | 1/2003 | McIntyre et al. | 700/83 X |
| 2003/0009572 | A1 | 1/2003 | Thurner | 709/230 |
| 2003/0051074 | A1 * | 3/2003 | Edwards | 710/1 |
| 2003/0120817 | A1 * | 6/2003 | Ott et al. | 709/249 |
| 2003/0167449 | A1 * | 9/2003 | Warren et al. | 715/531 |
| 2003/0177201 | A1 * | 9/2003 | Shen | 709/218 |
| 2003/0208545 | A1 | 11/2003 | Eaton et al. | 709/206 |
| 2003/0224769 | A1 * | 12/2003 | Solve et al. | 455/418 |
| 2004/0214566 | A1 | 10/2004 | Suzuki et al. | |
| 2004/0267729 | A1 * | 12/2004 | Swaminathan et al. | 707/3 |
| 2005/0038528 | A1 | 2/2005 | McKelvey et al. | 700/17 |
| 2005/0055429 | A1 | 3/2005 | Abele | 709/221 |
| 2005/0080799 | A1 | 4/2005 | Harnden et al. | 707/100 |
| 2005/0125441 | A1 | 6/2005 | Clemens et al. | 707/103 X |
| 2006/0022048 | A1 * | 2/2006 | Johnson | 235/462.1 |
| 2006/0149813 | A1 * | 7/2006 | Janik | 709/203 |
| 2006/0173873 | A1 * | 8/2006 | Prompt et al. | 707/100 |

FOREIGN PATENT DOCUMENTS

WO        WO 01 11586 A      2/2001

OTHER PUBLICATIONS

Compuquest, Inc., SpreadMsg Lite—Data Capture, Scanning, Extraction & Rule Based Instant Messaging Software, http://web.archive.org/web/20020813080848/http://www.compuquestinc.com/spmsgl.html.

International Business Machines Corporation, Cross platform instant messaging using web services, Research Disclosure, Kenneth Mason Publications, Hampshire, GB, vol. 458, No. 156, Jun. 2002.

W3C, Web Services Description Language, http://www.w3.org/TR/wsd1.

Vasudevan, A Web Services Primer, Apr. 4, 2001, XML.com, http://webservices.xml.com/pub/a/ws/2001/04/04/webservices/index.html.

* cited by examiner

SYSTEM AND METHODOLOGY PROVIDING ADAPTIVE INTERFACE IN AN INDUSTRIAL CONTROLLER ENVIRONMENT

TECHNICAL FIELD

The present invention relates generally to industrial control systems, and more particularly to a system and methodology to provide an adaptive user interface for an industrial controller system.

BACKGROUND OF THE INVENTION

Industrial controllers are special-purpose computers utilized for controlling industrial processes, manufacturing equipment, and other factory automation, such as data collection or networked systems. In accordance with a control program, the industrial controller, having an associated processor (or processors), measures one or more process variables or inputs reflecting the status of a controlled system, and changes outputs effecting control of such system. The inputs and outputs may be binary, (e.g., on or off), as well as analog inputs and outputs assuming a continuous range of values. Control programs may be executed in a series of execution cycles with batch processing capabilities.

Measured inputs received from such systems and the outputs transmitted by the systems generally pass through one or more input/output (I/O) modules. These I/O modules serve as an electrical interface to the controller and may be located proximate or remote from the controller including remote network interfaces to associated systems. Inputs and outputs may be recorded in an I/O table in processor memory, wherein input values may be asynchronously read from one or more input modules and output values written to the I/O table for subsequent communication to the control system by specialized communications circuitry (e.g., back plane interface, communications module). Output modules may interface directly with one or more control elements, by receiving an output from the I/O table to control a device such as a motor, valve, solenoid, amplifier, and the like.

Various control modules of the industrial controller may be spatially distributed along a common communication link in several racks. Certain I/O modules may thus be located in close proximity to a portion of the control equipment, and away from the remainder of the controller. Data is communicated with these remote modules over a common communication link, or network, wherein modules on the network communicate via a standard communications protocol. Many industrial controllers can communicate via network technologies such as EtherNet/Ip (e.g., IEEE802.3, TCP/IP, UDP, EtherNet/IP, and so forth), ControlNet®, DeviceNet® or other network protocols (Foundation Fieldbus (H1 and Fast Ethernet) Modbus/TCP, Profibus) and also communicate to higher level computing systems. Industrial controllers utilize the aforementioned technologies along with other technology to control multiple applications ranging from complex and highly distributed to more traditional and repetitious applications.

At the core of the industrial control system, is a logic processor such as a Programmable Logic Controller (PLC) or PC-based controller. Programmable Logic Controllers are programmed by systems designers to operate manufacturing processes via user-designed logic programs or user programs. The user programs are stored in memory and generally executed by the PLC in a sequential manner although instruction jumping, looping and interrupt routines, for example, are also common. Associated with the user program are a plurality of memory elements or variables that provide dynamics to PLC operations and programs. These variables can be user-defined and can be defined as bits, bytes, words, integers, floating point numbers, timers, counters and/or other data types to name but a few examples.

User Interfaces are often employed to interact with controllers when creating and downloading user programs. In addition, control processes are often monitored from the interfaces, wherein one or more of the controller variables may be adjusted by an operator during the control process. In many aspects however, these interfaces are somewhat inflexible to the controller environments supported and the features offered therein.

SUMMARY OF THE INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The present invention relates to a system and methodology to provide an adaptive user interface framework to facilitate various interactions with an industrial control system. The user interface can be adapted to operate across various platforms and devices that cooperate to perform industrial control. This includes adapting the interface to determined capabilities of the platforms such as determining what hardware or software resources are presently available on the platform and adapting, selecting, and/or adjusting interface capabilities according to the determined resources. In addition, interface features can be automatically and/or manually adjusted based upon activities or capabilities of an interface operator and in accordance with a plurality of configuration options. Other options can include adapting formats and protocols to the capabilities of the device or user operating the interface.

In one aspect of the present invention, the user interface can be performed in a local execution environment, a remote execution environment, or a combination thereof. In accordance with local operations, smart cards or smart plug-ins can be adapted to control or restrict access to the control system. Such aspects can include voice recognition features for validating and authenticating users that desire controller access. Other local options include adapting wearable interface devices such as glasses or goggles to provide operator display that also can include voice capabilities such as a microphone to affect interface controls. In another aspect modifiable and configurable interfaces such as a browser can be provided, wherein instead of only providing users with a single, standard interface for controller access, configurations options are provided to enable users to select from a plurality of interface types and associated controls to modify a selected interface.

In yet another aspect, the user interface can be adapted as a remote web service or a combination of a local interface employing remote web services to support the local interface. For example, this can include employing such services as an alerting, event service and/or a messenger service that support other interface capabilities such as monitoring, adjusting and operating a control system (e.g., facilitate real time message transactions between interface users). Still other aspects include pushing content and/or controls from a remote system to further enhance interface capabilities at the local system (e.g., pushing JPEG interface display, Active X controls).

Furthermore, in addition to providing a plurality of various interface types and controls, the present invention facilitates adapting interface capabilities to various protocols and formats for different types of devices that may operate the interface and remote systems attempting access thereto.

The following description and the annexed drawings set forth in detail certain illustrative aspects of the invention. These aspects are indicative, however, of but a few of the various ways in which the principles of the invention may be employed and the present invention is intended to include all such aspects and their equivalents. Other advantages and novel features of the invention will become apparent from the following detailed description of the invention when considered in conjunction with the drawings.

DETAILED DESCRIPTION OF THE INVENTION

The present invention relates to a system and methodology providing adaptive user interface capabilities in an industrial control environment. A user interface is provided that can operate across various software and/or hardware platforms. The platforms can be adapted with smart devices and/or wearable devices to facilitate access to a control system and can be adapted as a remote web service and/or adapted to interact with the service. The user interface can be tuned or adjusted in accordance with device capabilities operating the interface (e.g., alter interface displays and controls depending on platform) and can be adjusted or modified according to various operator or administrative preferences.

Figure 1:
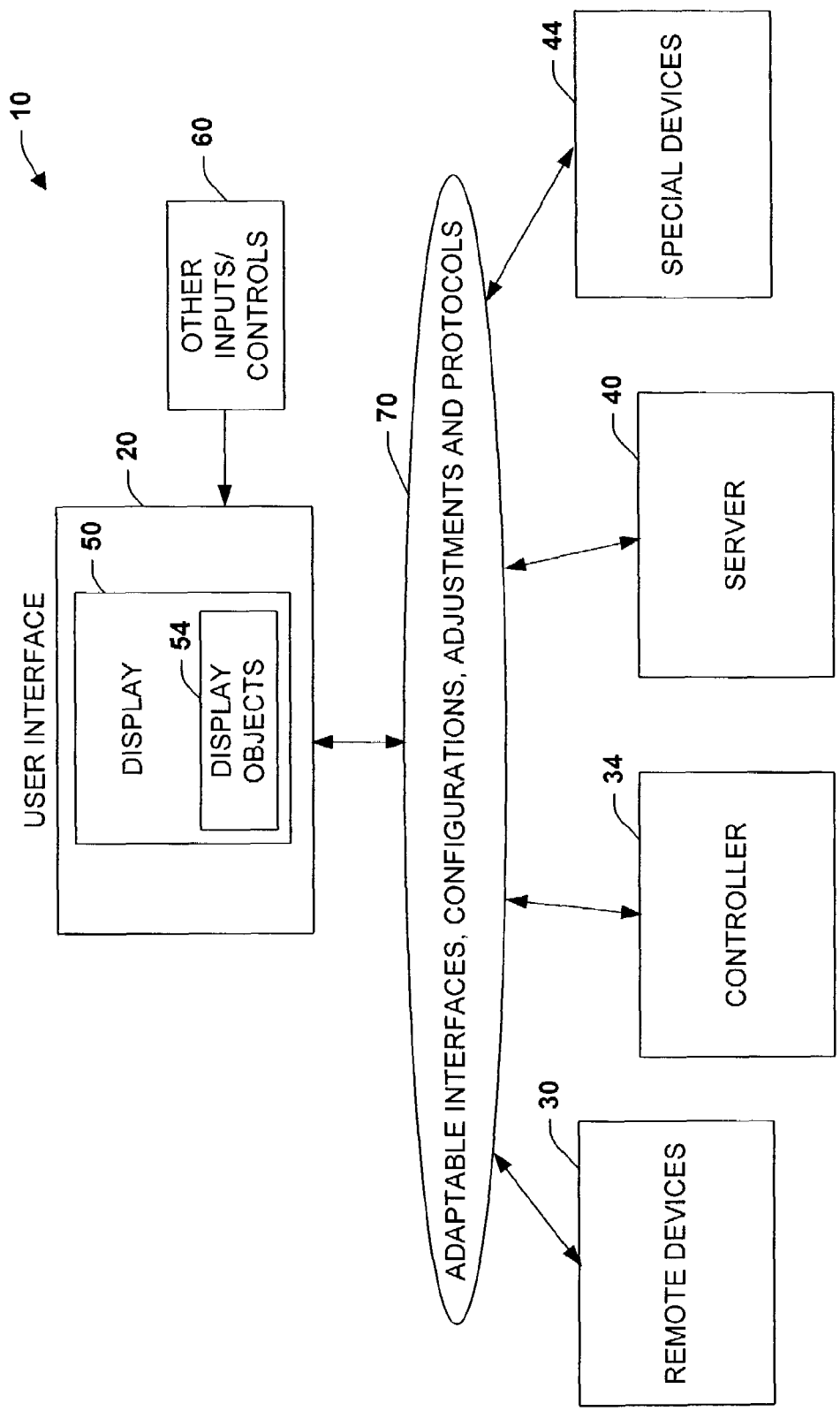
FIG. 1 is a schematic block diagram illustrating an industrial control system and namespace aggregation component in accordance with an aspect of the present invention.

Referring initially to FIG. 1, a system 10 illustrates an adaptable interface architecture and control system in accordance with an aspect of the present invention. The system 10 includes a user interface 20 that can adapt to, interact with and/or execute on various control platforms such as one or more remote devices 30 (e.g., network cards, smart cards, I/O devices), controllers 34 (e.g., Programmable Logic Controller (PLC)), network servers 40, and/or special devices 44 such as a wearable device for operating the interface 20. The user interface 20 can include a display 50 having associated display objects 54 for interacting with the user. For example, the display 50 includes control system Human and Machine Interfaces (HMI) having graphical display (e.g., Graphical User Interface (GUI)) capabilities in order to provide feedback and output data to a user or system regarding various aspects of the system 10 (e.g., providing status or view of control system or program/logic).

The display objects 54 can include such aspects as configurable icons, buttons, sliders, input boxes, selection options, menus, tabs and so forth having multiple configurable dimensions, shapes, colors, text, data and sounds to facilitate operations with the system 10. In addition, the user interface 20 can also include a plurality of other inputs or controls 60 for adjusting and configuring one or more aspects of the present invention. This can include receiving user commands from a mouse, keyboard, speech input, web site, remote web service and/or other device such as a camera or video input to affect or modify operations of the user interface 20.

According to one aspect of the present invention, the user interface 20 is adaptable to a plurality of various control applications and/or situations. Adaptability is illustrated at reference numeral 70, wherein the user interface 20 can be adapted to execute with or in conjunction with one or more of the platforms 30 through 44. This can include providing a plurality of interfaces at 70 that are selectable by a user, and/or are adapted to capabilities of the platform. As one example, it may be determined that the remote device 30 is capable of receiving voice commands and providing Liquid Crystal display outputs to the user. In this example, the user interface 20 may then be provided to the user (e.g., pushed, downloaded, provided by remote web service) and adapted for receiving voice commands and driving the associated display type. In other words, the user interface 20 is tailored to the capabilities of the device. In another example, it may be determined that a user is of a particular type. For example, a maintenance type user may desire to interact with different type interfaces (e.g., troubleshooting interfaces) and displays than a plant manager or other type user (e.g., productivity interfaces). In addition to tailoring the user interface to user/device capabilities at 70, the present invention facilitates a plurality of modifiable and/or configurable interface options that are described in more detail below. Moreover, a plurality of various protocols may be adapted at 70 for different platforms 30-44 to facilitate flexible operations and communications with the user interface 20.

Figure 2:
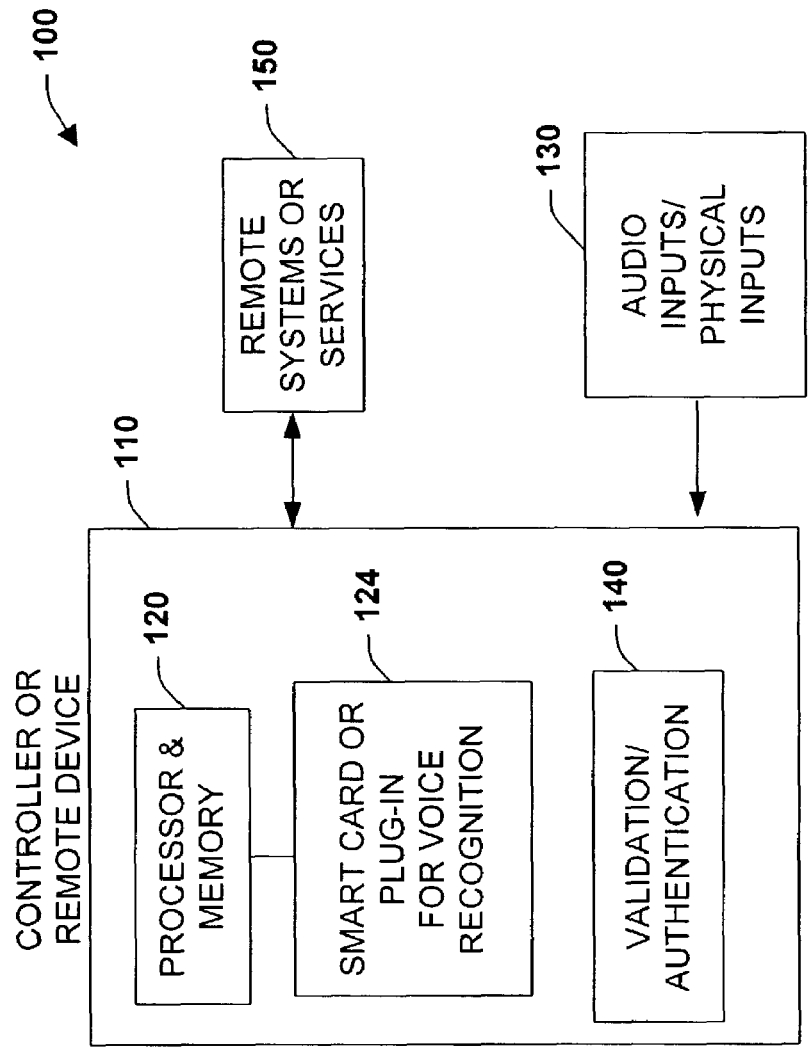
FIG. 2 is a schematic block diagram illustrating a voice-operated interface in accordance with an aspect of the present invention.

Referring now to FIG. 2, a system 100 is adapted for voice operations in accordance with an aspect of the present invention. The system 100 includes a controller or remote device/server 110 having an associated processing and memory subsystem 120 that can include an operating system (not shown). A smart card 124, such as a commercially available bus card (e.g., PCI bus) and adapted for voice recognition, can be provided to analyze voice patterns from one or more audio inputs 130 such as from a microphone or audio file transmitted via a network. The smart card 124 can process predetermined voice patterns or codes (e.g., Hidden Markov Models) that are stored in the memory subsystem 120, wherein the processing includes comparing the audio inputs 130 with one or more stored audio patterns.

Audio pattern recognition can then enable voice activated validation and/or authentication procedures 140 to occur before gaining access to the system 100. As an example, a user may attempt to gain access to the controller 110. Before user interface access is granted to the user, an authentication code or sequence may be performed via the components 124 and 140. The user may speak a predetermined pattern or code in the user's own voice, wherein the component 124 digitizes the voice, and compares the digitized voice pattern with patterns stored in memory 120 (or at remote web service). If the digitized voice compares suitably with a pattern previously stored, access can then be granted to the controller 110. In another aspect, probabilistic analysis may be performed on the audio inputs 130, wherein if spoken words are within a predetermined probability threshold for a user's voice, access can be granted (e.g., 75% likelihood spoken sequence belongs to user 1). It is to be appreciated that voice recognition can occur via software components as well as the smart card previously described. For example, a remote system, device, and/or service 150 can load speech recognition software onto the controller 110 via a network before speech processing activities occur in accordance with the validation and/or authentication procedures at 140. It is to be appreciated that a plurality of other validation/authentication techniques and/or devices can be employed. For example, these techniques can include retinal scan, fingerprint recognition, and/or other distinguishing human characteristics and associated detectors/processors.

Figure 3:
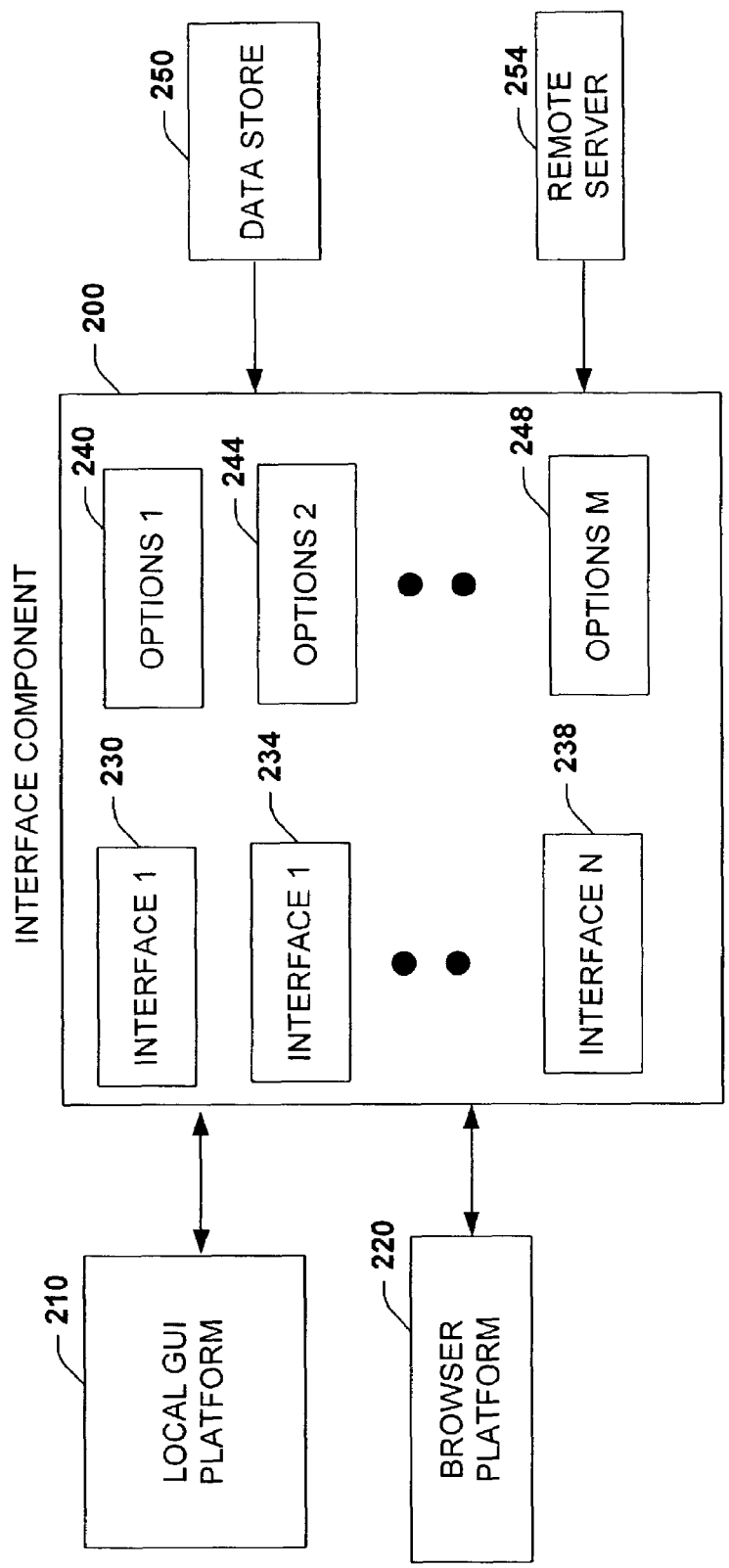
FIG. 3 is a schematic block diagram illustrating a modifiable and configurable interface in accordance with an aspect of the present invention.

Turning to FIG. 3, an interface component 200 is illustrated in accordance with an aspect of the present invention. The interface component 200 facilitates adapting a local interface or platform 210 and/or a remote interface or platform 220 with characteristics of a local and/or remote device or user environment. As an example, the local interface 210 may be a computer connected to a controller and operating a GUI type interface, whereas the remote interface 220 may be operated as a browser or web-type interface and interacting with a remote device such as a networked I/O card. The interface component 200 includes a plurality of interface types 230-238 and interface options 240-248. The interface types and options can be served from a local data store 250 and/or from a remote server, service, and/or web site at 254.

In one aspect of the present invention, the interface types 230-238 are automatically determined and installed on the local 210 or remote platforms 220. The platforms can send a configuration code or sequence to the interface component 200 indicating the capabilities of the platform. The code can indicate resources available such as a display type, memory capabilities, communications capabilities, module type, and input capabilities. Based on the code received, the interface component 200, transmits an interface 230-238 (e.g., software to operate interface) having associated interface options 240-248 to the local or remote platform 210 and/or 220. The code can also specify a predetermined file number that is associated with an interface type such as a controller requesting a number 1 interface, a handheld device selecting a number 2 interface, and a remote workstation selecting a number N interface, N being an integer. The interface options 240-248 can include a display size, number and type of inputs displayed, number of outputs displayed, colors employed, shapes employed, icons, other devices that can access the interface 200, programming options, user type and other options such as displayed file types.

In another aspect, the interfaces 230-238 and associated options 240-248 are user or administrator selectable. This could include providing a local selection menu at the local platform 210 and/or providing selection options from the remote platform at 220 such as from a web page. A user or administrator can select from a predetermined list of interface options, or alternatively answer questions or follow an interface/configuration wizard to indicate available resources of the platform. Upon indicating the available resources, the interface component 200 can transmit an interface type 230-238 and associated options 240-248, if necessary, that are suited to the resources specified by the user.

Figure 4:
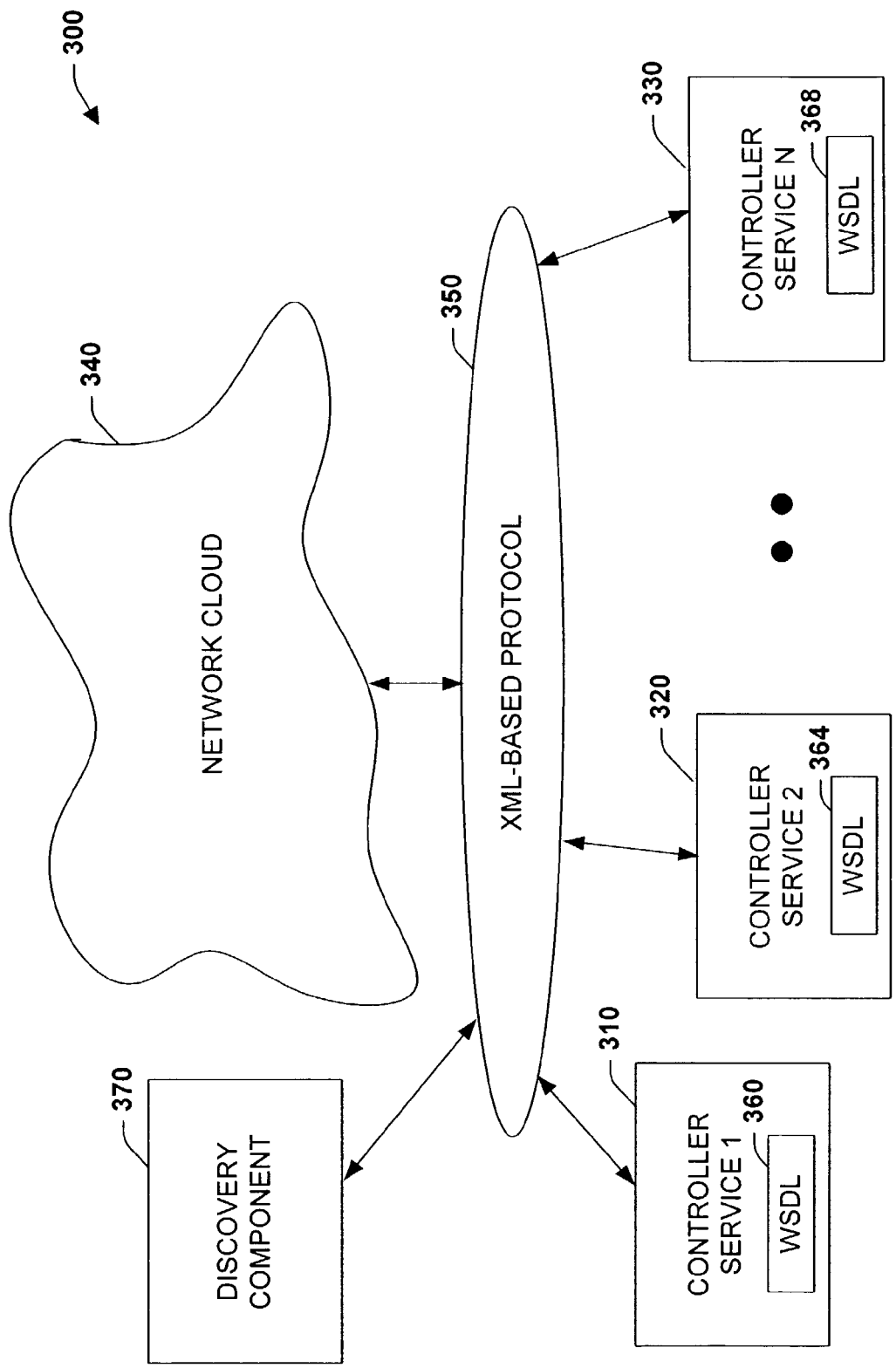
FIG. 4 is a schematic block diagram illustrating a web services architecture in accordance with an aspect of the present invention.

Before proceeding to a discussion of possible adaptable interfaces that can be provided or augmented from a remote web service, FIG. 4 illustrates a web architecture 300 that can be employed in accordance with the adaptive interfaces of the present invention.

Referring to FIG. 4, a system 300 illustrates web interface and protocols in accordance with an aspect of the present invention. A plurality of controller services 310 through 330 interact with a network cloud 340 via an XML-based protocol 350, wherein the network cloud can be served by a plurality of network servers or controllers operating as servers (not shown). In general, the protocol 350 should be an open standard defined for use on a public communications systems such as the Internet. In one aspect, a Simple Object Access Protocol (SOAP) 350 can be employed as a communications protocol for XML Web services. SOAP is an open specification that defines an XML format for messages between services. The specification can include describing how to represent program data as XML and how to utilize SOAP to perform Remote Procedure Calls. These optional parts of the specification are employed to implement Remote Procedure Call (RPC)-style applications, wherein a SOAP message containing a callable function, and the parameters to pass to the function, is sent from a client such as a control system, and the server returns a message with the results of the executed function. Most current implementations of SOAP support RPC applications since programmers who are familiar to COM or CORBA applications understand the RPC style. SOAP also supports document style applications whereby the SOAP message is provided as a wrapper around an XML document. Document-style SOAP applications are very flexible, wherein a control system XML Web service can take advantage of this flexibility to build controller services that may be difficult to implement with RPC.

Other parts of the SOAP specification define what an HTTP message that contains a SOAP message may appear as. HTTP binding can be important because HTTP is supported by almost all current operating systems. HTTP binding is optional, but almost all SOAP implementations support it as one possible standardized protocol for SOAP. For this reason, there's a common misconception that SOAP requires HTTP. Some implementations support MSMQ, MQ Series, SMTP, or TCP/IP transports, but almost all current XML Web services employ HTTP because it is ubiquitous. Since HTTP is a core protocol of the Web, most organizations have a network infrastructure that supports HTTP. Security, monitoring, and load-balancing infrastructure for HTTP are also readily available. It is to be appreciated that commercially available tools can be employed to construct SOAP messages directly. This can include a SOAP toolkit to create and parse SOAP messages. These toolkits generally translate function calls from a computer language to a SOAP message. For example, a Microsoft SOAP Toolkit 2.0 translates COM function calls to SOAP and an Apache Toolkit translates JAVA function calls to SOAP.

The controller services 310 through 330 can also employ an open interface standard such as a Web Service Description Language (WSDL) illustrated at 360 through 368 in order to provide interactions with the controller services and remote user interface aspects of the present invention. In general, a WSDL file or interface is an XML document that describes a set of SOAP messages and how the messages are exchanged. In other words, WSDL 360-368 is to SOAP what Interface Description Language (IDL) is to CORBA or COM. Since WSDL is in XML format, it is readable and editable but in most cases, it is generated and consumed by software. WSDL specifies what a request message contains and how the response message will be formatted in unambiguous notation. As an example, an I/O service can specify how inputs are to be requested from the service and how outputs can be sent to the service in the form of a response. In another aspect, inputs can be requested from an input service, wherein the response is a confirmation that the inputs were received. Outputs can be sent to an output service in the form of a request, wherein the response from the service is that the outputs were received. The user interfaces previously described can thus receive inputs from and/or send outputs to a respective web service in order to operate the adaptive portions of the interface.

The notation that a WSDL file utilizes to describe message formats is based on an XML Schema standard which implies it is both programming-language neutral and standards-based which makes it suitable for describing XML Web services interfaces that are accessible from a wide variety of platforms and programming languages. In addition to describing message contents, WSDL defines where the service is available and what communications protocol is employed to communicate to the service. This implies that a given WSDL file defines substantially all matters required to write a program to work with an XML Web service. As noted above, there are several tools available to read a WSDL file and generate code to communicate with an XML Web service. For example, some of the most capable of these tools are in Microsoft Visual Studio® .NET. It is noted that further reference to the WSDL specification can be found at http://www.w3.org/TR/wsdl, if desired.

The system 300 can also include a discovery component 370, wherein the controller services 310-330 can be published and determined. In one aspect, a Universal Discovery Description and Integration (UDDI) can be provided at 370 that serves as a type of logical "phone" directory (e.g., "yellow pages," "white pages," "green pages") describing Web services. A UDDI directory entry is an XML file that describes a controller system and the services it offers. There are generally three parts to an entry in the UDDI directory. The "white pages" describe the component offering the service: name, address, and so forth. The "yellow pages" include industrial categories based on standard taxonomies such as the North American Industry Classification System and Standard Industrial Classifications. The "green pages" describe the interface to the service in enough detail for users to write an application to employ the Web service. The manner services are defined is through a UDDI document called a Type Model or tModel. In many cases, the tModel contains a WSDL file that describes a SOAP interface to an XML Web service, but the tModel is generally flexible enough to describe almost any kind of service. The UDDI directory also includes several options to search for the services to build remote applications. For example, searches can be performed for providers of a service in a specified geographic location or for an entity of a specified type. The UDDI directory can then supply information, contacts, links, and technical data to enable determinations of which services to employ in a control process or interface type.

Figure 5:
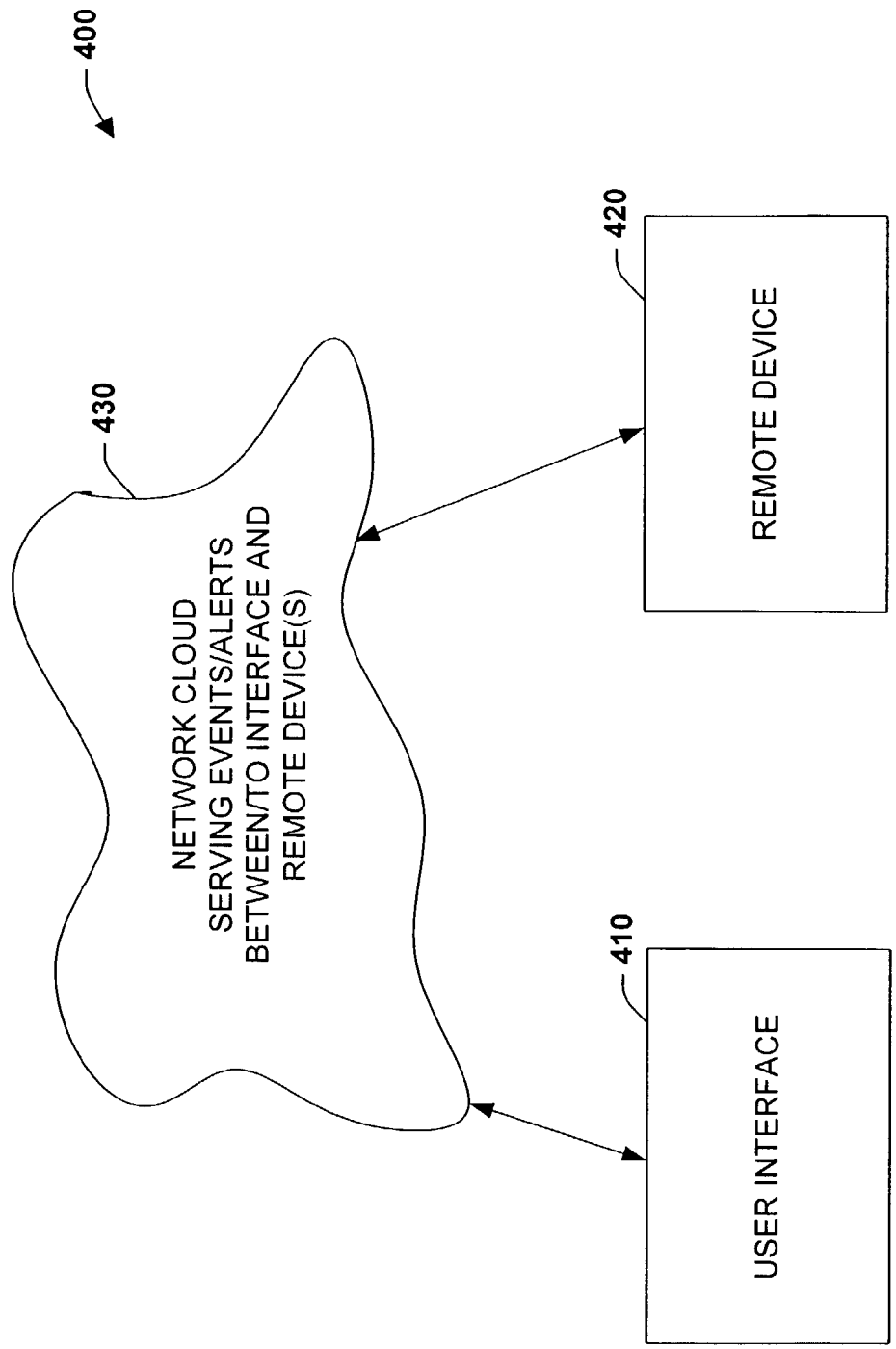
FIG. 5 is a schematic block diagram illustrating an alerting and event notification service and interface in accordance with an aspect of the present invention.

Referring now to FIG. 5, a system 400 illustrates a user interface 410 and remote device 420 interacting with an event or alerting service provided by a cloud 430 (e.g., .NET, CE.NET compatible web service supplied from one or more remote servers). In one aspect of the present invention, the user interface 410 is adapted to communicate with a remote web service such as a .NET alerting service via the cloud 430. For example, a commercially available web service (e.g., Microsoft® .NET Alerts) can be monitored by the user interface 410 to receive messages or event notifications from the service. The messages can be from other users or remote devices 420 indicating status or potential problems within a control system. Other type alerts can be generated from the cloud 430 such as virus alerts or alerts indicating that new software packages are available. When alerts or message events are received, the user interface 410 can display this information to an operator, and/or configure a subsequent automated event such as generating an e-mail with details of the event provided to the remote devices 420.

Figure 6:
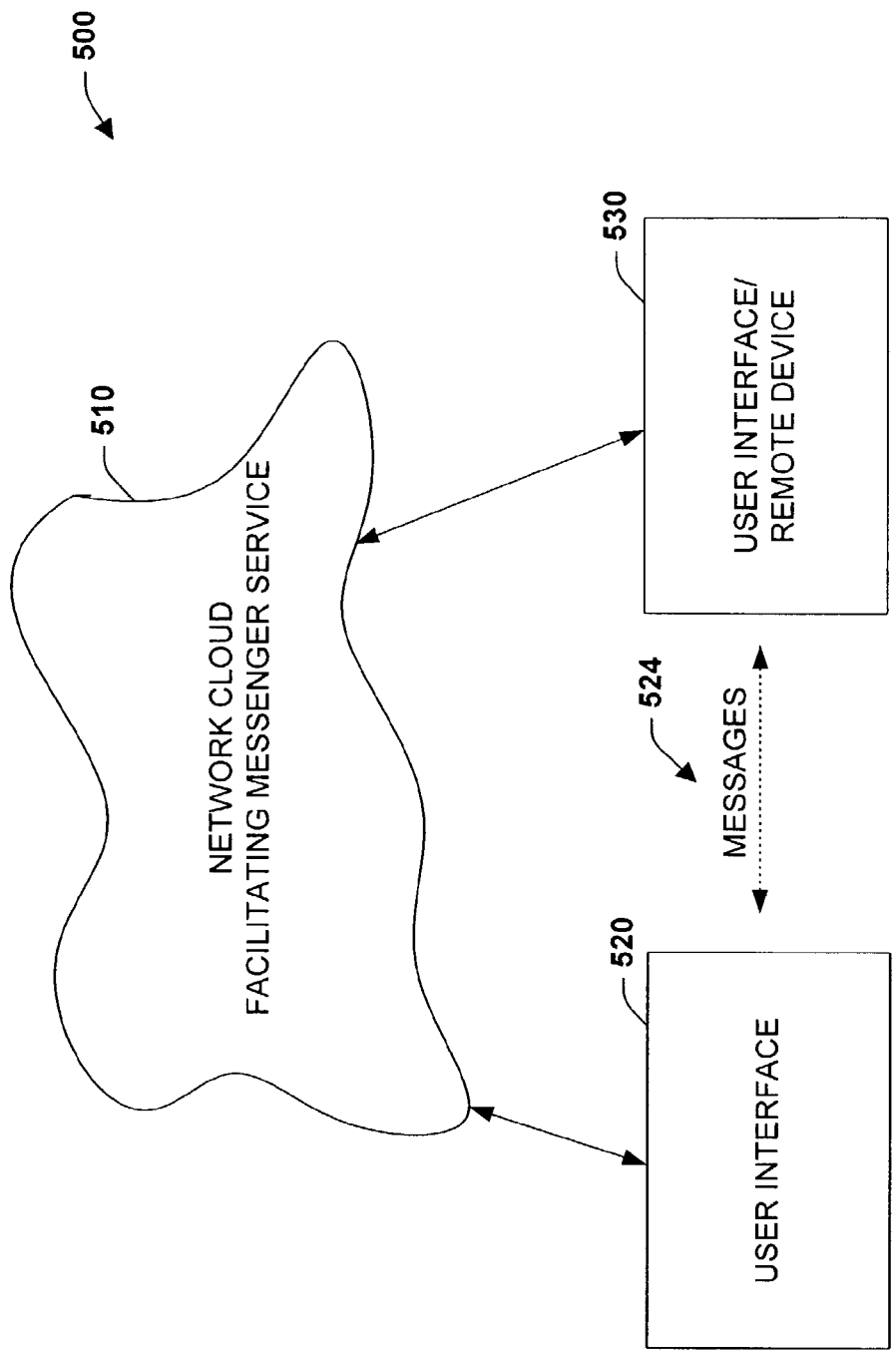
FIG. 6 is a schematic block diagram illustrating a messenger service and interface in accordance with an aspect of the present invention.

Referring to FIG. 6, a messenger service and user interface 500 is illustrated in accordance with an aspect of the present invention. A network cloud 510 which is served by one or more remote servers (not shown) provides a messenger service that can be adapted and employed with a user interface 520. The user interface 520 employs the messenger service to transmit/receive messages 524 to/from other user interfaces and/or remote systems 530 adapted to interact with the messenger service. Messenger services can be operated with commercially available message services that are offered as remote web services. These services offer in many cases substantially real time communications across public networks such as the Internet. For example, the messenger service can transmit messages 524 between the platforms 520 and 530 in a much more rapid manner than such services as an e-mail service that is typically routed in a circuitous and sometimes unpredictable manner. In another aspect, the generated messages can be configured and/or adapted to be routed to a user and/or to a device (e.g., pager, cell phone, PDA, computer, industrial terminal, another controller, I/O device, communications device, and so forth).

Figure 7:
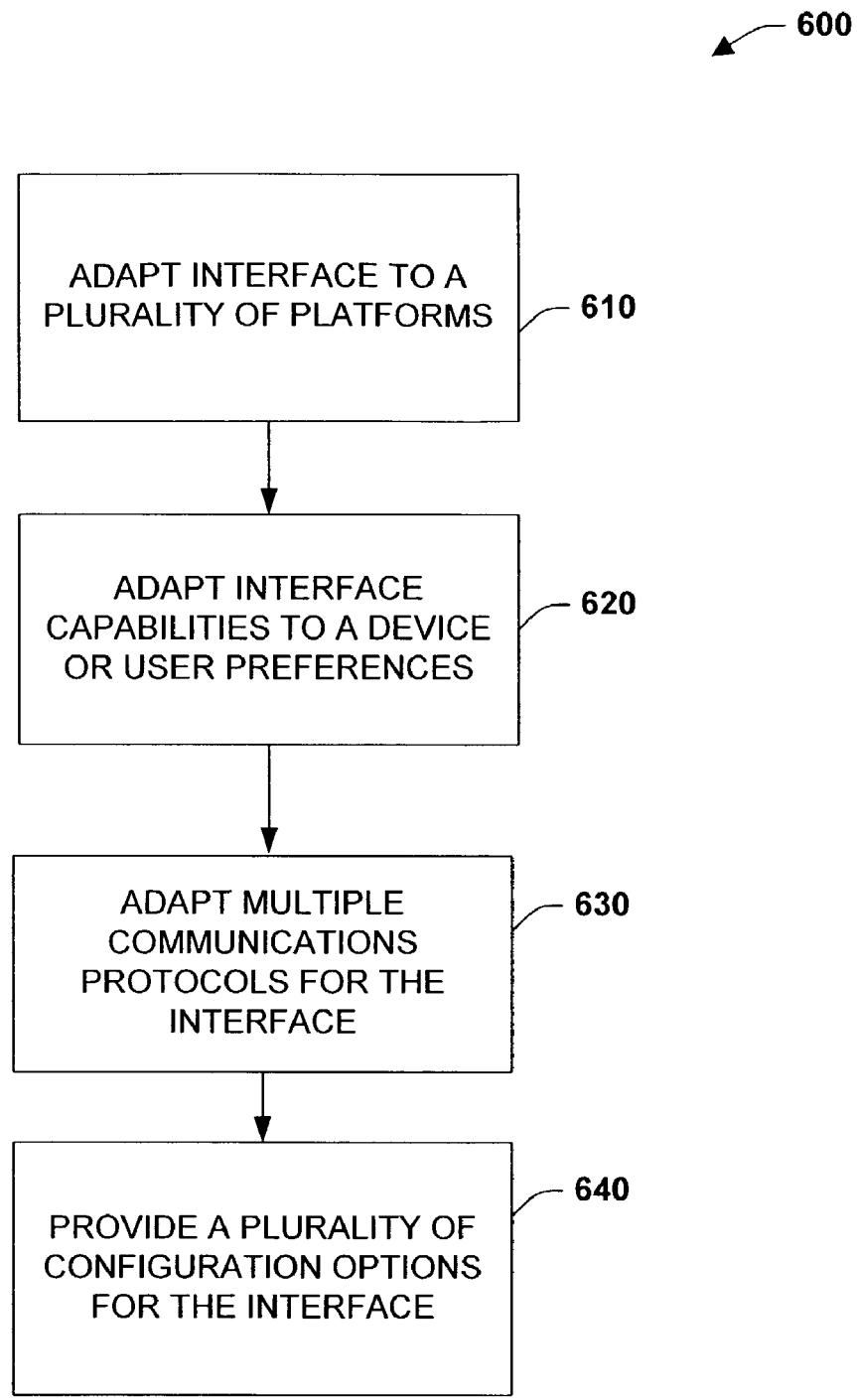
FIG. 7 is a flow diagram illustrating adaptive interfaces in accordance with the present invention.

FIG. 7 is a flow diagram illustrating a methodology 600 providing an adaptive interface in accordance with the present invention. While, for purposes of simplicity of explanation, the methodology is shown and described as a series of acts, it is to be understood and appreciated that the present invention is not limited by the order of acts, as some acts may, in accordance with the present invention, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the present invention.

Proceeding to 610, user interfaces are adapted to interact with various platforms. This can include web service interactions, remote device interactions such as with as controller, an I/O device, a communications module, and/or a wearable device for interacting with a control system that is described in more detail below. At 620, interface capabilities are adapted to device capabilities and/or user preferences. This can include testing or sampling remote device resources and serving an interface to the device and/or computer operating the device that is automatically selected for the capabilities of the device. A plurality of interfaces can be stored and served in accordance with device capabilities such as memory size, display size/type, input capabilities, output capabilities, and/or other interface considerations. Web pages and or local interface pages can be served to enable users or administrators to select from a plurality of interface options. As an example, one type of interface may be selected for a handheld device, a different interface selected for a wireless device, still yet another interface selected for a small PLC (SLC), and still yet another interface type selected for a PLC. As can be appreciated, a plurality of such selections can be provided in accordance with various device capabilities.

At 630 multiple communications protocols can be employed to communicate with the interface (e.g., Modbus/TCP, TCP/IP, FOUNDATION Fieldbus HSE, EtherNet/IP). This can also include formatting data based upon device capabilities, translating data received from the remote device to a protocol employed by the controller or PLC, and translating between proprietary protocols such as Control and Information Protocols (CIP), DeviceNet, ControlNet, to an open form such as an XML schema via an interface object adapted to perform such translations. At 640, a plurality of configuration options can be provided with the user interfaces provided in 610 through 630. This can include display configuration options, input device selections, program selections, protocol selections, PLC selections, remote device selections, and include such aspects as icon selections, color selections, alerting options (e.g., e-mail address where to send message), message options (e.g., messenger service, e-mail service, pager numbers) and other options.

Figure 8:
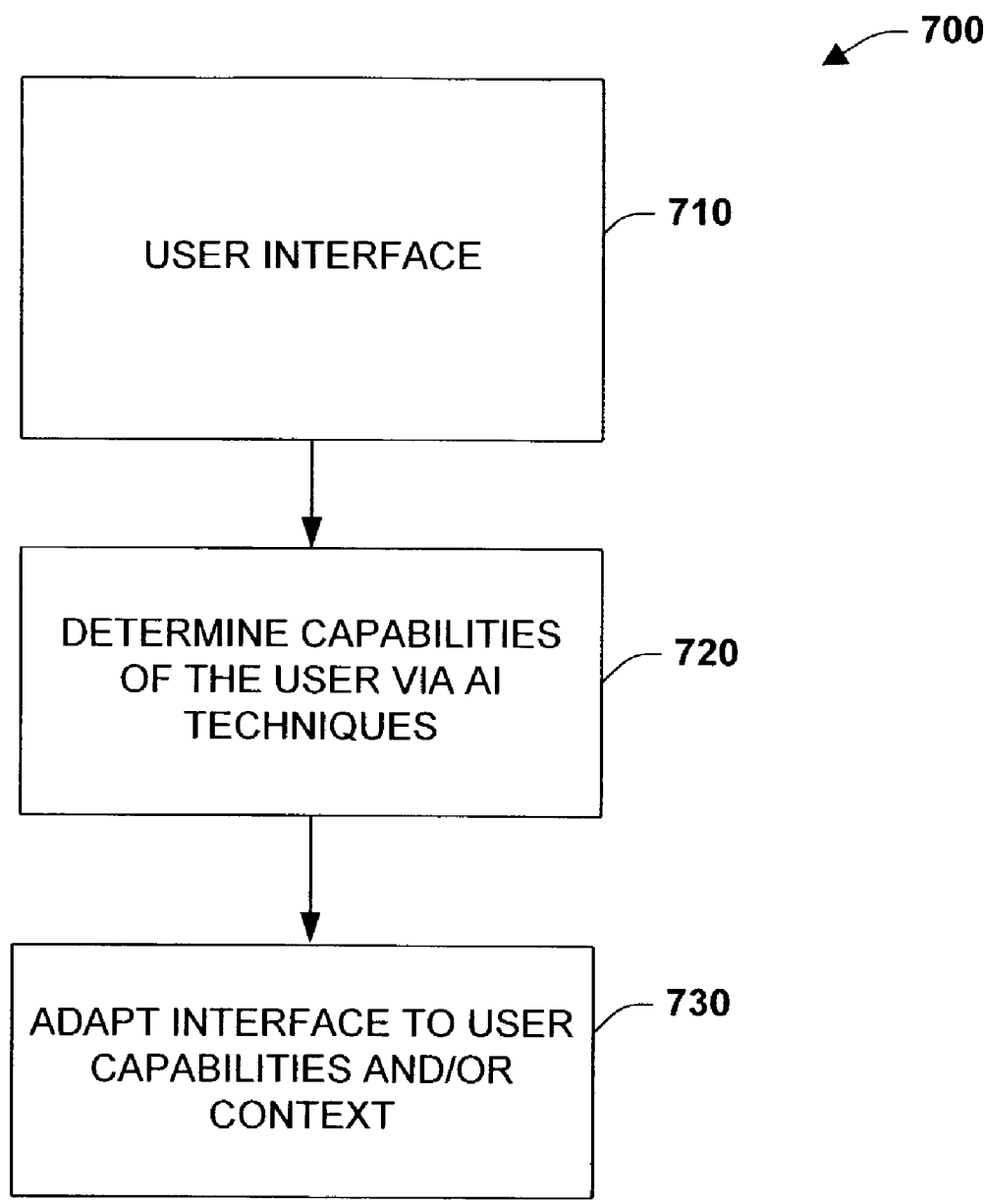
FIG. 8 is a flow diagram illustrating user-adapted interfaces in accordance with an aspect of the present invention.

Referring to FIG. 8, a user interface system and process 700 is illustrated in accordance with the present invention. The system 700 includes a user interface 710 to interact with one or more remote systems (not shown). At 720, aspects of a user are determined. This can include applying artificial intelligence techniques and/or probability analysis to infer a context (e.g., what is user doing, how busy is the user, how focused is the user, what are the user's goals) for the user and/or determine one or more characteristics of the user. This can include monitoring sound and/or video inputs of the user at 710, monitoring microphone or mouse/keyboard activities to determine a user state such as present context. When the capabilities of the user have been determined, an interface can be automatically provided at 730 that relates to the capabilities determined at 720.

In accordance with one aspect of the present invention, the user interface 710 monitors/determines overall user attributes or capabilities at 720 and selects, alters, adjusts, and/or tunes an associated interface at 730 according to the determined capabilities or attributes. As one example, attributes may include where a user is currently located, what device is accessible by the user, time access is requested, capabilities of the device, and so forth. As another example, this can include rules-based determinations (e.g., if the user appears to be searching a program for problems provide troubleshooting interface, if user appears to be adding new code, provide programming interface), algorithmic determinations, and/or other determinations such as statistical analysis, probabilistic analysis, and/or higher-level inference analysis that may be applied in accordance with artificial intelligence or other techniques which are described in more detail below.

Based on an analysis of user capabilities and/or attributes, the user interface 710 performs a plurality of various actions to cause changes in the interface provided to the user, interface operations, performance, and/or configuration. It is to be appreciated that changes can also occur based upon regularly scheduled events such as routine conditions (e.g., flag fired from a timer or a calendar) and/or in accordance with predetermined time intervals (e.g., in the morning, provide operations interface).

Artificial intelligence techniques can be provided to effect interface decisions (e.g., what interface to display based on determined user capabilities) including such techniques as Bayesian analysis and belief networks. This type analysis can be employed to determine such aspects as interface type selected and interface or configuration options provided to the user. Other analysis aspects can include transforming data between protocols such as XML and local controller protocols to facilitate more efficient processing of data acquired from multiple sources. For example, a plurality of XML files, schemas or blobs may be received from remote systems describing various resources. Although the XML data can be processed in its present form, it may be more efficient to transform all or portions of the data to a different form such as a binary file, HEX file, a structure, an array, and/or other form before processing begins. This can include applying higher level language functions (e.g., convert ASCII to binary ( ), define structure, format array) that are commonly available in compiled code such as object languages, C and C++, for example. This can also include instruction sequences that input a known code type (e.g., XML), and maps the code type to one or more other code types in accordance with the mapping (e.g., characters such as 20 followed by % maps ASCII 20 into binary 20 followed by multiplication of 0.01).

In accordance with one aspect of the present invention, interface types can be determined in a regular manner according to a regular query of resources initiated by the user such as mouse and keyboard activities. For example, inputs, data, a sequence of data, a variance of data and/or patterns of data or inputs received by the user interface 710 can be monitored for possible trends or inferences derived from the data. This can include statistical or probability analysis to determine possible user characteristics.

In another aspect of the present invention, user patterns (e.g., patterns of interface activities) can be stated as a general probabilistic estimate to determine a performance condition given monitored evidence of an input pattern or occurrence. The estimate can be stated as:

EXAMPLE 1

$Pr(Chp|E_1, E_2, \ldots E_J)$;

wherein Pr is a probability, Chp relates to a character determinations given evidence E relating to determining user activities and context, and J being an integer. This can also include evidence of consistency with a previous user patterns to predict likely future outcomes or performance conditions. It is noted that probability models can be constructed from typical controller or system operations. This can include monitoring user resources for typical variances and monitoring such aspects as how often particular events occur (e.g., how often does this user access keyboard). Classification models can be constructed that learn routine behaviors or user patterns in order to generate probabilities that predict possible future user patterns. For example, such techniques can include Support Vector Machines (SVM), Naive Bayes, Bayes Net, decision tree, similarity-based, vector-based, and/or other learning models or combinations thereof. Classifiers can be stated as a function that maps an input attribute to the confidence that the input belongs to a class. In the case of recognizing human characteristics to determine user states, attributes can be typical data subsets or values sampled over the course of time (e.g., user activities monitored from a plurality of systems/inputs at predetermined intervals) and/or include other pattern-specific attributes derived from the data subsets.

Figure 9:
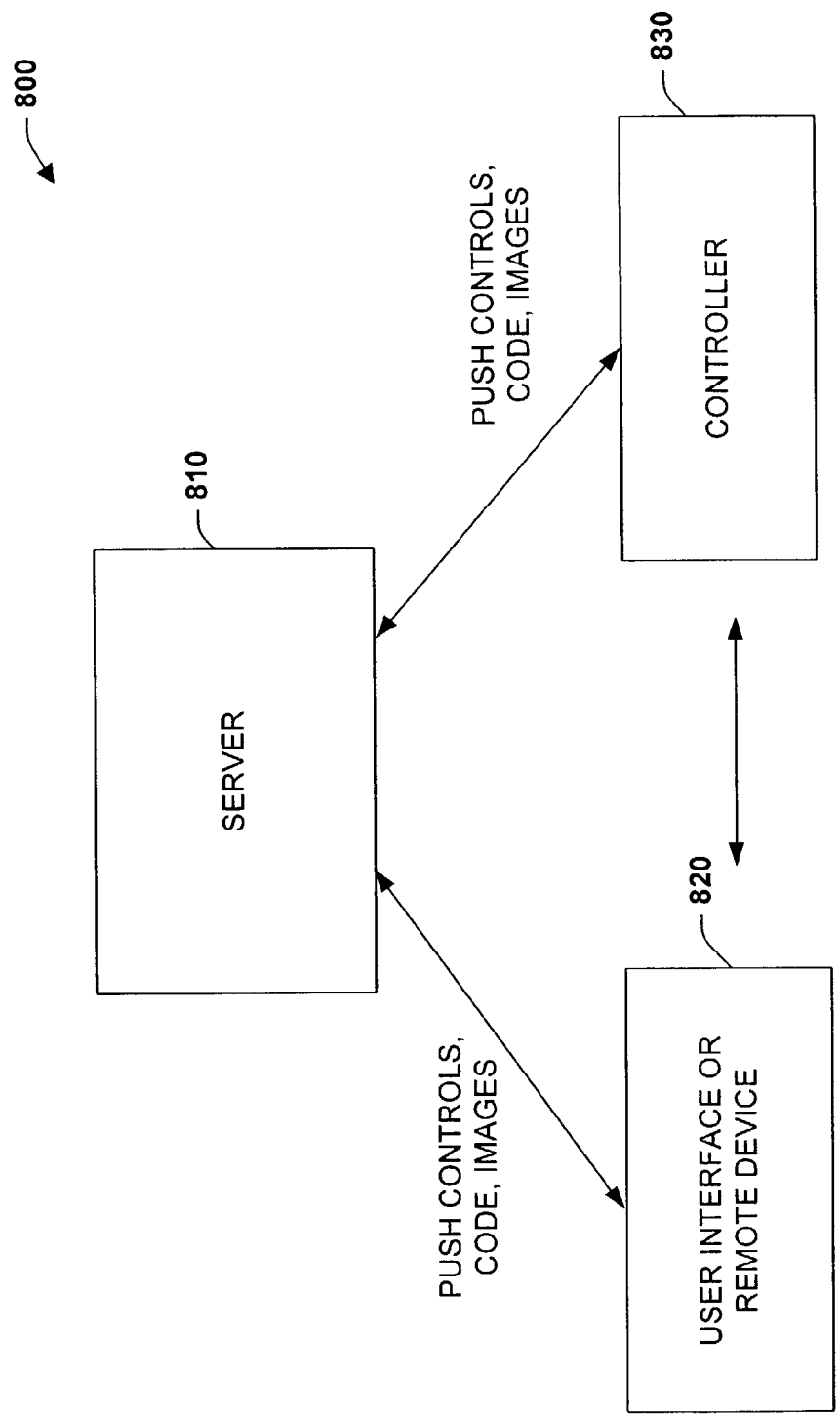
FIG. 9 is a schematic block diagram illustrating a push system and interface in accordance with an aspect of the present invention.

Referring now to FIG. 9, a push system 800 is illustrated in accordance with the present invention. The system 800 includes a remote server 810 that can push (e.g., download) a plurality of features from the server to a user interface 820 (or remote device) and controller 830. The user interface 820 can then employ the pushed features when interacting with the controller 830. For example, the server can push images such as a JPEG, TIFF, GIFF, Bit map, and/or other type image to the user interface 820 and/or controller 830 to facilitate interface displays and/or controller operations. Other loadable aspects include pushing code such as an executable, pushing rich content to enhance interface activities, and can include employing a web page/interface page as a facilitator to access a particular code type on an as needed basis. This can include providing access to controls such as Active X controls, Distributed Component Object Model Interfaces (DCOM), WSDL Interfaces, SOAP message descriptions, and/or other controls such as JAVA or CORBA controls.

Figure 10:
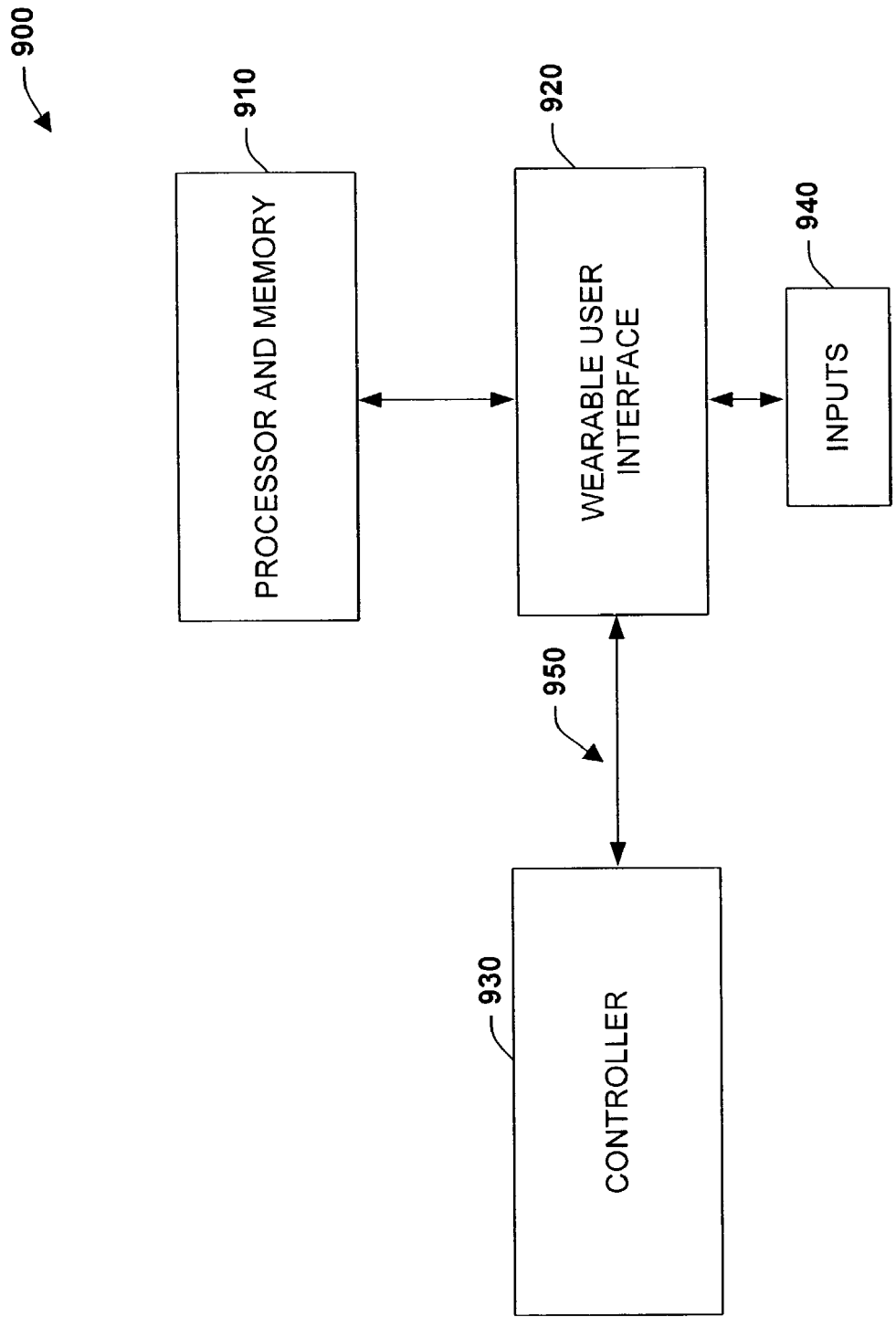
FIG. 10 is a schematic block diagram illustrating a wearable interface in accordance with an aspect of the present invention.

Referring now to FIG. 10, a wearable interface system 900 is illustrated in accordance with the present invention. A processor and associated memory component 910 drives a wearable interface 920 that interfaces to a controller or other remote device 930. The wearable interface 920 can include substantially any type of device that is adapted to a user's body. This can include glasses, goggles, hats, headgear, helmets and so forth. The processor and memory 910 can be adapted to execute the wearable interface to enable the user to interact with the controller 930. One or more inputs 940 can be provided that facilitate interface operations. These inputs can include microphone inputs, hand held keyboard inputs, wireless inputs, and other type inputs, if desired. The wearable interface 920 can also provide display capabilities such as displaying a small interface window in one or both panes of a set of glasses or goggles. Even though the interface display in reality may only be a few square centimeters or less, it may appear as normal size being that the interface is worn near the user's eye and thus, provides a perspective about that of a standard desktop type display. Moreover, the wearable device may provide a plurality of connection options to the controller 930 via transmission line or frequency at 950. For example, hardwired connections can occur, network connections are possible, infrared (or other frequency), optical connections such as fiber optic, and/or wireless connections can occur between the interface and the controller. In addition, wireless aspects can include employment of Bluetooth protocol/interface standards capabilities when interacting between the wearable interface 920 and the controller 930. Other type communications can include RF/video transmissions, visible/non-visible spectrum modalities of transmitting data such as Wi-Fi 802.11a & .11B, an IrDa standard for infrared communications, and/or such technologies such as DSL, CableModem, and HomePNA (power line carrier/carrier-band data transfer).

What has been described above are preferred aspects of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. An industrial control system, with an adaptable user interface comprising:
    a display to provide a control system output to a user;
    at least one display object to direct the control system and the display;
    an interface component that dynamically selects at least an interface from a plurality of interface types associated with a plurality of platform capabilities and provides the display object based at least on resource capabilities of a remote device wherein the remote device sends a configuration code comprising at least a file number associated with the selected interface to the interface component indicating its resource capabilities, wherein the interface component recognizes speech to facilitate authentication and validation of the user for access to the control system;
    a discovery component that publishes information regarding one or more services associated with the control system and permits searches on the information, the discovery component provides information regarding one or more components providing the one or more services, one or more industrial categories, and a description of an interface of the services that enables users to write applications to employ the services.

2. The system of claim 1, the interface component adapted to a smart card that recognizes speech to facilitate authentication and validation of the user.

3. The system of claim 2, the interface component recognizes speech based upon at least one of a soft plug-in component and a remote web service.

4. The system of claim 1, the interface component interacts with at least one of a controller, an I/O device, a communications module, a server and a special device.

5. The system of claim 4, the interface component interacts with at least a special device and the special device is a wearable device adapted for at least one of glasses, goggles, hats, headgear, and helmets.

6. The system of claim 5, the wearable device is at least one of glasses and goggles and the wearable device includes a display that is presented to the user in at least one lens of the glasses and goggles.

7. The system of claim 5, the wearable device receives at least one input that includes at least one of a microphone, a video input, and a keystroke input.

8. The system of claim 5, the wearable device is adapted for at least one of a wired connection, a wireless connection, and an optical connection.

9. The system of claim 8, further comprising at least one of Bluetooth, RF transmissions, video transmissions, visible and non-visible spectrum modalities of transmitting data, an IrDa standard for infrared communications, DSL, CableModem, power line carrier, and carrier-band data transfer.

10. The system of claim 1, the interface component receives at least one external input, the external input including at least one a mouse, a keyboard, a speech input, a web site, a remote web service, a video input to affect operations of the interface component.

11. The system of claim 1, the interface component is adapted to at least one of a local platform and a remote platform.

12. The system of claim 1, the interface component includes a plurality of interface types and associated interface options.

13. The system of claim 1, the configuration code indicates available resources, the resources including at least one of a display type, a memory capability, a communications capability, a module type, and an input capability.

14. The system of claim 1, access is granted if spoken words are within a predetermined probability threshold for the user's voice.

15. The system of claim 1, a digitized version of the user's voice is compared to patterns stored in memory and access is granted upon a suitable comparison with a previously stored pattern.

16. The system of claim 1, the interface component is adaptable to user preferences gathered through one of a selection menu or an interface configuration wizard.

17. A method to facilitate an adaptable interface in an industrial controller environment, comprising:

receiving from a plurality of remote platforms requests to adapt a control system interface based on their respective resource capabilities;

determining the capabilities of the platforms using respective configuration codes transmitted by the platforms;

selecting an interface associated with a received configuration code from a plurality of interface types, wherein the configuration code specifies at least a file number of a requested control system interface;

providing the selected control system interface customized in accordance with the determined capabilities of the platforms, the interface is adapted to a smart card that recognizes speech to facilitate authentication and validation of the user;

publishing information regarding one or more services associated with the control system, the published information comprises information regarding one or more components providing the one or more services, information associated with one or more industrial categories, and a description of the control system interface services that enables users to write applications to employ the services; and providing options to search the published information.

18. The method of claim 17, further comprising wearing the control system interface.

19. A system to facilitate an adaptable interface in an industrial controller environment, comprising:

means for communicating capabilities of a plurality of remote devices via configuration codes transmitted by the remote devices;

means for adapting a control system interface to the plurality of remote devices in accordance with the capabilities of the remote devices by selecting the interface using the received configuration codes from a plurality of interface types associated with a plurality of platform capabilities;

means for publishing searchable information regarding one or more services associated with the control system, the published information comprises information regarding one or more components providing the one or more services, information associated with one or more industrial categories, and a description of interface services to enable users to write applications to employ the services; and means for speech recognition to authenticate and validate a user.

* * * * *